(12) United States Patent
Gotoh et al.

(10) Patent No.: US 11,897,322 B2
(45) Date of Patent: Feb. 13, 2024

(54) POWER STORAGE DEVICE

(71) Applicant: Toyota Jidosha Kabushiki Kaisha, Toyota (JP)

(72) Inventors: Yutaroh Gotoh, Toyota (JP); Yukinari Tanabe, Okazaki (JP); Yugo Mochizuki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 17/387,306

(22) Filed: Jul. 28, 2021

(65) Prior Publication Data

US 2022/0032759 A1    Feb. 3, 2022

(30) Foreign Application Priority Data

Jul. 30, 2020 (JP) .................. 2020-129306

(51) Int. Cl.
| | |
|---|---|
| *B60K 1/04* | (2019.01) |
| *H01M 10/61* | (2014.01) |
| *H01M 10/625* | (2014.01) |
| *H01M 10/6569* | (2014.01) |
| *B60K 1/00* | (2006.01) |

(52) U.S. Cl.
CPC ............. *B60K 1/04* (2013.01); *H01M 10/61* (2015.04); *H01M 10/625* (2015.04); *H01M 10/6569* (2015.04); *B60K 2001/005* (2013.01); *B60K 2001/0438* (2013.01); *H01M 2220/20* (2013.01)

(58) Field of Classification Search
CPC ............. B60K 1/04; B60K 2001/005; B60K 2001/0438; H01M 10/61; H01M 10/625; H01M 10/6569; H01M 2220/20; H01M 10/6554; B60L 50/66; B60L 50/64
See application file for complete search history.

(56) References Cited

U.S. PATENT DOCUMENTS

| 10,166,883 B2* | 1/2019 | Brendecke ............... B60L 58/26 |
|---|---|---|
| 2008/0164081 A1* | 7/2008 | Watanabe ......... H01M 10/6566 |
| | | 180/68.5 |
| 2019/0312320 A1 | 10/2019 | Uchiyama et al. |
| 2019/0356028 A1 | 11/2019 | Cassard et al. |
| 2020/0076026 A1 | 3/2020 | Ohkuma |
| 2020/0227706 A1 | 7/2020 | Kuno |

FOREIGN PATENT DOCUMENTS

| EP | 3345783 A1 | 7/2018 |
|---|---|---|
| JP | 2001-023703 A | 1/2001 |
| JP | 2019-200993 A | 11/2019 |
| JP | 2020-113410 A | 7/2020 |
| JP | 2020-113528 A | 7/2020 |

\* cited by examiner

*Primary Examiner* — Jason D Shanske
*Assistant Examiner* — James J Triggs
(74) *Attorney, Agent, or Firm* — Dinsmore & Shohl LLP

(57) ABSTRACT

A power storage device is a power storage device provided on a lower surface of a floor panel of a vehicle, the power storage device including: a housing case; a power storage module housed in the housing case; and a cooler housed in the housing case to cool the power storage module, wherein the housing case includes a bottom plate, a refrigerant passage through which a refrigerant flows is formed in a portion of the housing case, the portion being located above the bottom plate, and the refrigerant passage is connected to the cooler.

9 Claims, 19 Drawing Sheets

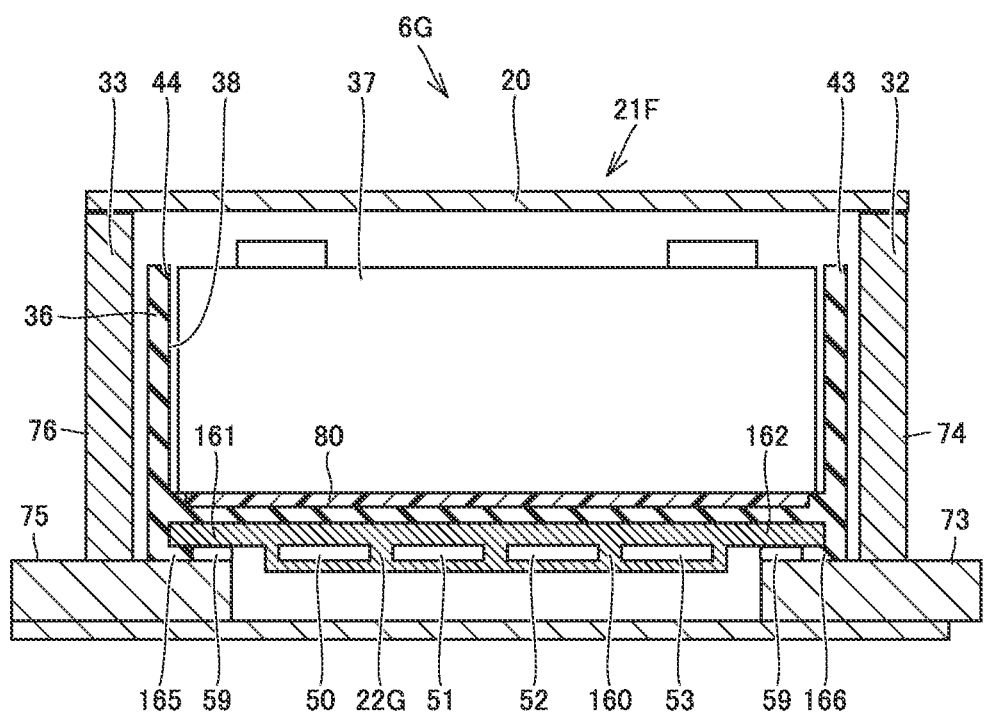
FIG.19
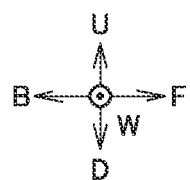

POWER STORAGE DEVICE

CROSS REFERENCE TO RELATED APPLICATIONS

This nonprovisional application claims priority to Japanese Patent Application No. 2020-129306 filed on Jul. 30, 2020 with the Japan Patent Office, the entire contents of which are hereby incorporated by reference.

BACKGROUND

Field

The present disclosure relates to a power storage device.

Description of the Background Art

Various types of power storage devices have been conventionally proposed. A power storage device described in Japanese Patent Laying-Open No. 2019-200993 includes a power storage module, a cooling device that cools the power storage module, and a housing case. The power storage module and the cooling device are housed in the housing case, and a refrigerant flows in the cooling device.

It is conceivable to dispose a power storage device including a cooling device on a lower surface of a vehicle, in order to ensure a wide vehicle compartment space. When the power storage device is disposed on the lower surface of the vehicle, the bottom surface side of the power storage device is heated by radiant heat and the like from the ground.

Therefore, depending on a position of a supply pipe that supplies a refrigerant to the cooling device, a power storage module is in some cases not cooled satisfactorily due to an influence of the radiant heat from the ground.

SUMMARY

The present disclosure has been made in light of the above-described problem and an object of the present disclosure is to provide a power storage device in which a power storage module provided in the power storage device can be cooled satisfactorily even when the power storage device is disposed on a lower surface of a vehicle.

A power storage device according to the present disclosure is a power storage device provided below a floor panel of a vehicle, the power storage device including: a housing case; a power storage module housed in the housing case; and a cooler housed in the housing case to cool the power storage module. The housing case includes a bottom plate, a refrigerant passage through which a refrigerant flows is formed in a portion of the housing case, the portion being located above the bottom plate, and the refrigerant passage is connected to the cooler.

According to the above-described power storage device, even when a temperature of the bottom plate of the housing case increases due to radiant heat from the ground, an increase in temperature of the refrigerant flowing through the refrigerant passage can be suppressed because the refrigerant passage is located above the bottom plate. Thus, the temperature of the refrigerant supplied to the cooler can be kept low, and the power storage module can be cooled satisfactorily.

The vehicle includes a body frame, the housing case includes a peripheral wall portion extending upward from the bottom plate and disposed at a position adjacent to the body frame, and the refrigerant passage is formed in the peripheral wall portion.

According to the above-described power storage device, even when the heated air flows from the vehicle forward side, impingement of the heated air on the peripheral wall portion can be suppressed by the body frame. Therefore, since the refrigerant passage is formed in the peripheral wall portion, heating of the refrigerant in the refrigerant passage by the heated air can be suppressed.

The refrigerant passage includes a supply passage that supplies the refrigerant to the cooler, and a discharge passage through which the refrigerant discharged from the cooler flows, and the supply passage is located above the discharge passage.

According to the above-described power storage device, the supply passage is located above the discharge passage, and thus, even when the temperature of the bottom plate increases, an increase in temperature of the refrigerant flowing through the supply passage can be suppressed.

The housing case includes a first side wall portion located on one end side in a width direction of the vehicle, and a second side wall portion located on the other end side in the width direction, and the refrigerant passage is formed in the first side wall portion.

According to the above-described power storage device, a structure of the second side wall portion can be simplified, and thus, the manufacturing cost can be reduced.

The vehicle includes an engine, and an exhaust pipe connected to the engine, and the second side wall portion is disposed at a position adjacent to the exhaust pipe.

According to the above-described power storage device, the first side wall portion is distant from the exhaust pipe, and thus, heating of the refrigerant flowing through the refrigerant passage formed in the first side wall portion by heat from the exhaust pipe can be suppressed.

The vehicle includes an engine, and an exhaust pipe connected to the engine, the housing case includes a first side wall portion located on one end side in a width direction of the vehicle, and a second side wall portion located on the other end side in the width direction, the refrigerant passage includes a supply passage that supplies the refrigerant to the cooler, and a discharge passage through which the refrigerant discharged from the cooler flows, the supply passage is formed in the first side wall portion, the discharge passage is formed in the second side wall portion, and the second side wall portion is disposed at a position adjacent to the exhaust pipe.

According to the above-described power storage device, the discharge passage is formed in the second side wall portion, and thus, even when the second side wall portion is heated by the exhaust pipe, an increase in temperature of the second side wall portion is suppressed. Therefore, an increase in difference in temperature between the first side wall portion and the second side wall portion can be suppressed, and the occurrence of a large difference in temperature distribution in the power storage module can be suppressed.

The cooler is disposed on a lower surface of the power storage module. According to the power storage device, even when the temperature of the bottom plate increases, an amount of heat transmitted from the bottom plate to the power storage module can be reduced by the cooler.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 19 is a cross-sectional view showing a power storage device 6G according to a seventh modification.

DETAILED DESCRIPTION

Figure 1:
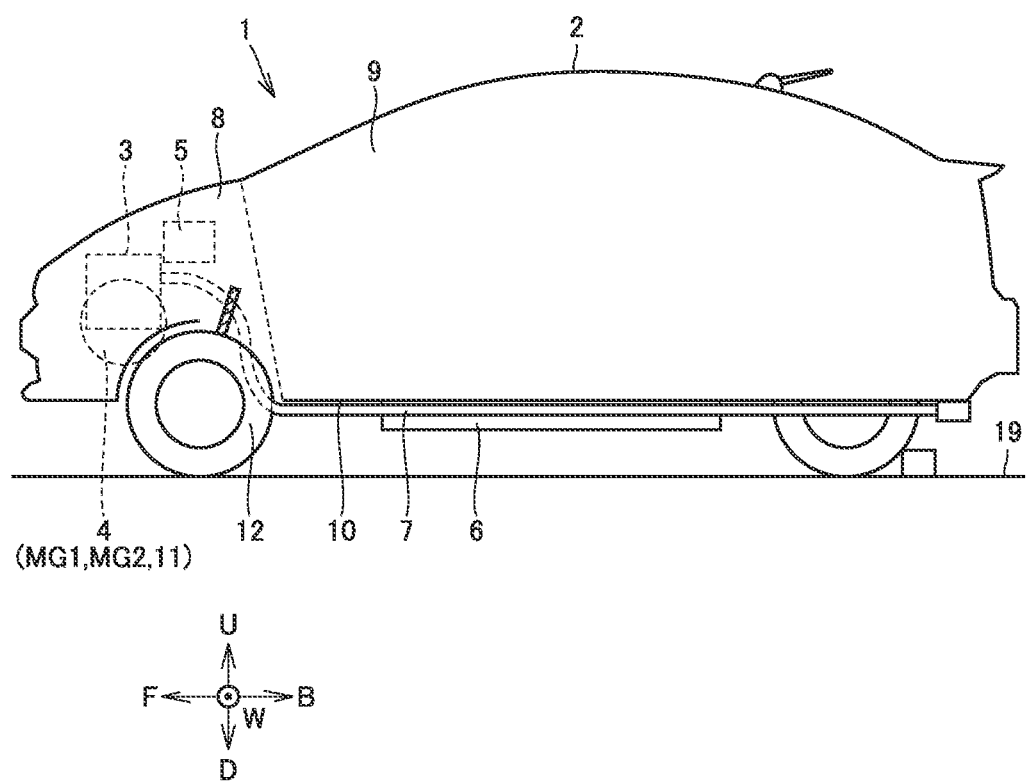
FIG. 1 is a schematic view schematically showing a vehicle 1 including a power storage device according to a first embodiment.

A power storage device according to the present embodiment will be described with reference to FIGS. 1 to 19. The same or substantially the same components of the configurations shown in FIGS. 1 to 19 are denoted by the same reference characters, and redundant description will not be repeated.

First Embodiment

FIG. 1 is a schematic view schematically showing a vehicle 1 including a power storage device according to a first embodiment. In FIG. 1 and the like, "F" represents a vehicle forward direction, "B" represents a vehicle backward direction, "W" represents a vehicle width direction, "U" represents an upward direction, and "D" represents a downward direction.

Vehicle 1 includes a body frame 2, an engine 3, a driving device 4, a PCU 5, a power storage device 6, and an exhaust pipe 7.

An engine compartment 8 and a vehicle compartment 9 are formed in body frame 2. Engine compartment 8 is formed in front of a vehicle compartment 9.

Body frame 2 includes a floor panel 10. Floor panel 10 forms a floor surface of vehicle compartment 9. Floor panel 10 is a metal member and is formed in a plate shape.

Engine 3, driving device 4 and PCU 5 are housed in engine compartment 8, and power storage device 6 is disposed below floor panel 10.

PCU 5 is electrically connected to power storage device 6. PCU 5 includes a converter and two inverters. The converter boosts DC power supplied from power storage device 6, and supplies the boosted DC power to the inverters. The inverters convert the DC power supplied from the converter into AC power, and supplies the AC power to driving device 4. For example, the inverters convert the DC power into three-phase AC power.

Driving device 4 includes a rotating electric machine MG1, a rotating electric machine MG2 and a power split device 11. Rotating electric machine MG2 generates driving force that rotates a driving wheel 12 using the AC power supplied from one inverter. Power split device 11 divides motive power from the engine into motive power to be transmitted to rotating electric machine MG1 and motive power to be transmitted to driving wheel 12. The other inverter is connected to rotating electric machine MG1.

Exhaust pipe 7 is connected to engine 3. Exhaust pipe 7 extends backward of vehicle 1 from engine 3 and extends downward. Exhaust pipe 7 is disposed on a lower surface of floor panel 10 and extends backward of vehicle 1.

In the first embodiment, exhaust pipe 7 extends through the left surface side of power storage device 6 toward the back end side of vehicle 1.

Figure 2:
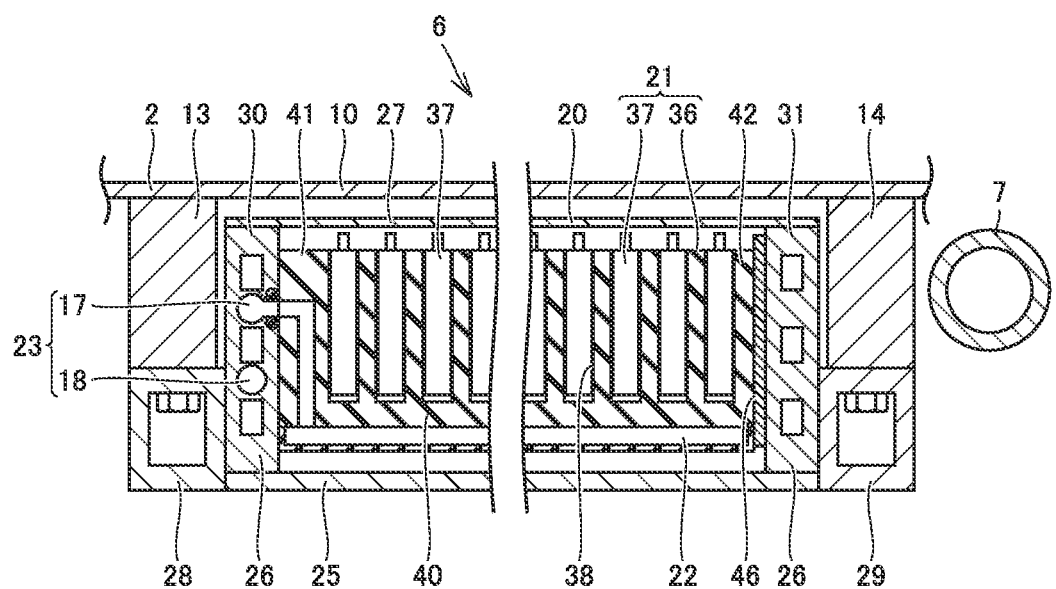
FIG. 2 is a cross-sectional view showing a configuration of a power storage device 6 and its surroundings.

FIG. 2 is a cross-sectional view showing a configuration of power storage device 6 and its surroundings. Body frame 2 includes members 13 and 14 disposed on the lower surface of floor panel 10. Members 13 and 14 are formed to extend in a front-back direction of vehicle 1, and member 13 and member 14 are spaced apart from each other in a vehicle width direction W. Examples of members 13 and 14 include a rocker member, a reinforcing member and the like. The rocker member is disposed below a door.

Power storage device 6 includes a housing case 20, a power storage module 21 and a cooler 22. Housing case 20 includes a bottom plate 25, a peripheral wall portion 26, a cover member 27, and fixed members 28 and 29.

Figure 3:
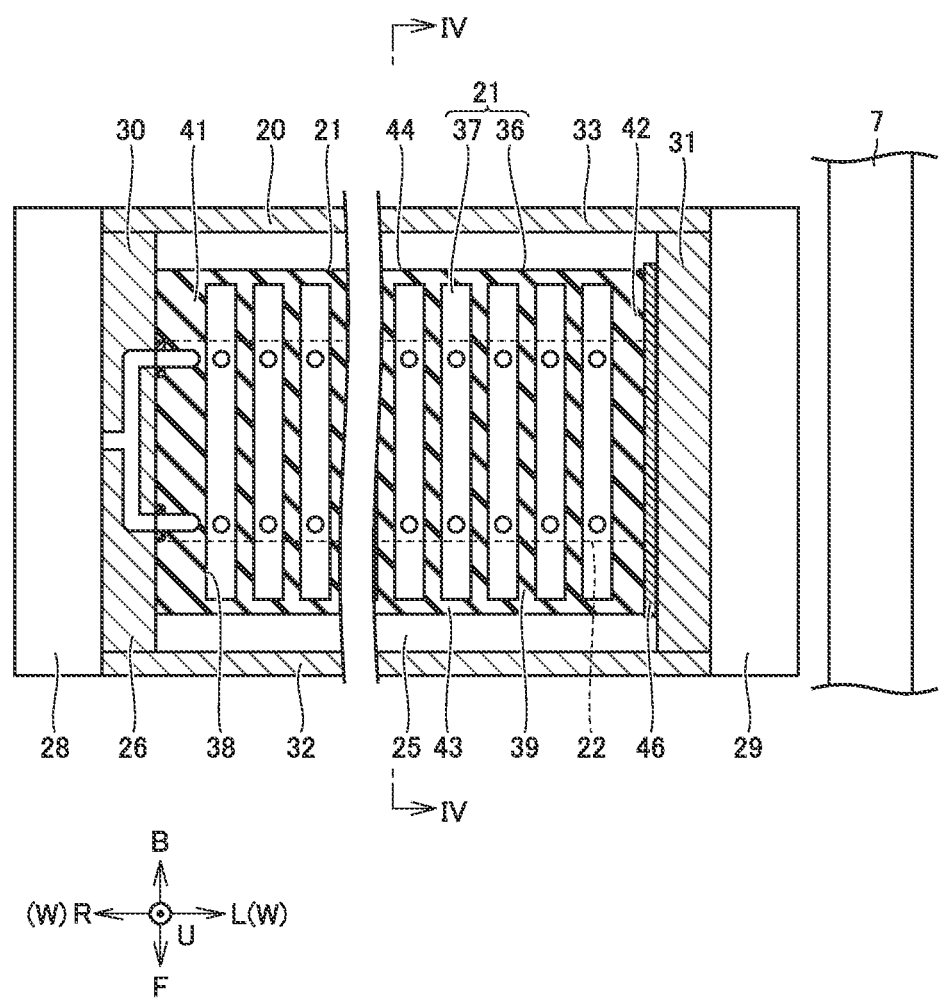
FIG. 3 is a plan view of power storage device 6 in a partial cross section.

Cover member 27 is disposed on an upper surface of housing case 20. Bottom plate 25 forms a lower surface of housing case 20. Peripheral wall portion 26 is formed to extend upward from bottom plate 25, and peripheral wall portion 26 is formed annularly. As shown in FIG. 3, peripheral wall portion 26 includes a right wall 30, a left wall 31, a front wall 32, and a back wall 33.

In FIG. 2, fixed member 28 is disposed on the outer surface side of right wall 30, and fixed member 29 is disposed on the outer surface side of left wall 31. Fixed members 28 and 29 are, for example, integrally fixed to bottom plate 25 and peripheral wall portion 26. Fixed member 28 is fixed to member 13 by a fastening member 35 such as a bolt, and fixed member 29 is fixed to member 14 by a fastening member such as a bolt. Fixed members 28 and 29 are fixed to members 13 and 14, respectively, such that housing case 20 is fixed to body frame 2.

Power storage module 21 includes a module case 36 and a plurality of unit cells 37 housed in module case 36.

In the first embodiment, module case 36 is made of resin. Module case 36 may be made of metal and the like.

Module case 36 includes a bottom plate 40, a right wall 41 and a left wall 42. As shown in FIG. 3, module case 36 further includes a front wall 43 and a back wall 44. Right wall 41, left wall 42, front wall 43, and back wall 44 are formed to extend upward from bottom plate 40.

Module case 36 is provided with a plurality of housing recessed portions 38 spaced apart from each other in vehicle width direction W. Each of housing recessed portions 38 is formed to open upward. Each of unit cells 37 is housed in each of housing recessed portions 38. Module case 36 is provided with a partition wall 39 located between adjacent unit cells 37. Insulation between adjacent unit cells 37 is ensured by partition wall 39. Unit cells 37 are spaced apart from each other and arranged in vehicle width direction W. In the present embodiment, the direction of arrangement of unit cells 37 corresponds to vehicle width direction W.

Right wall 41 is in close contact with an inner surface of right wall 30. An insertion member 46 is inserted between left wall 42 and left wall 31. Insertion member 46 is a plate-shaped member pressed into a gap between left wall 42 and left wall 31 when power storage module 21 is inserted into housing case 20. When insertion member 46 is pressed into the gap between left wall 42 and left wall 31, right wall 41 is pressed against right wall 30 and insertion member 46 is pressed against left wall 31.

Thus, power storage module 21 and insertion member 46 are fixed between right wall 30 and left wall 31 by the restraint force between right wall 30 and left wall 31. When each of unit cells 37 is charged and discharged, power storage module 21 is deformed to become longer in vehicle width direction W. As a result, the restraint force between right wall 30 and left wall 31 becomes stronger, and thus, power storage module 21 is satisfactorily fixed between right wall 30 and left wall 31.

Figure 4:
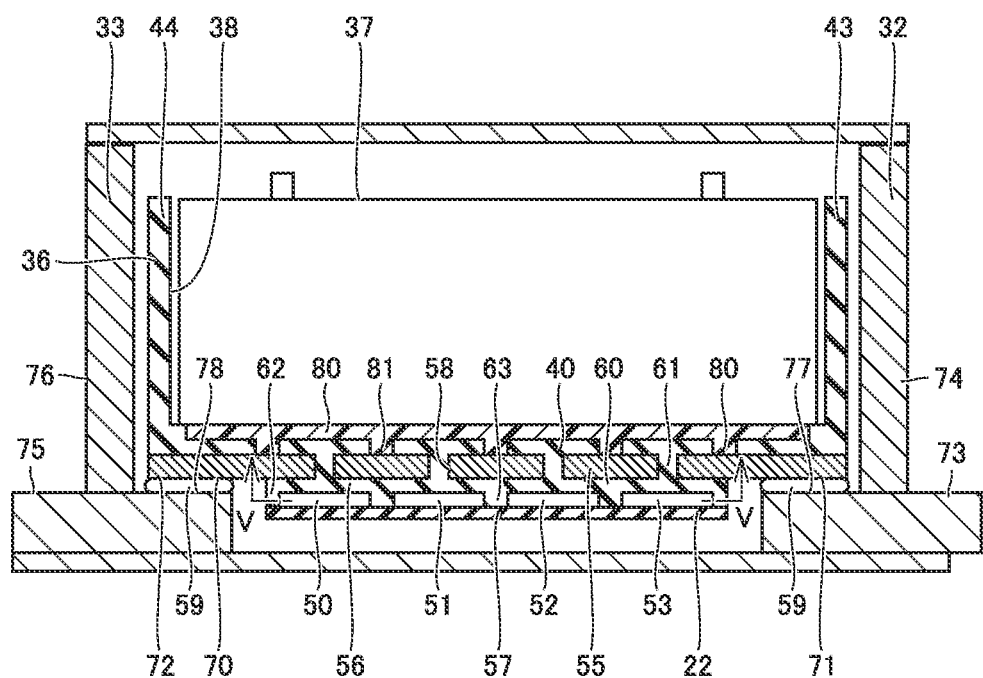
FIG. 4 is a cross-sectional view taken along line IV-IV shown in FIG. 3.
Figure 4:
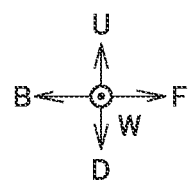

FIG. 4 is a cross-sectional view taken along line IV-IV shown in FIG. 3. Cooler 22 is provided with a plurality of cooling passages 50, 51, 52, and 53. Cooling passages 50, 51, 52, and 53 extend in vehicle width direction W and are spaced apart from each other in the vehicle front-back direction. A refrigerant C flows through each of cooling passages 50, 51, 52, and 53. Refrigerant C may be a liquid such as water, or may be a gas such as air. An expansion valve may be provided in a supply passage that supplies refrigerant C to cooler 22, to supply adiabatically-expanded refrigerant C to cooler 22.

Cooler 22 includes a metal plate 55, a case main body 56 and a bottom plate 57. Metal plate 55 is disposed on a lower surface of bottom plate 40 of module case 36, and metal plate 55 is provided with a plurality of through holes 58.

Case main body 56 includes a top plate 60, coupling portions 61, a peripheral wall 62, and a partition wall 63. Peripheral wall 62 extends downward from an outer peripheral edge portion of top plate 60 and is formed annularly. Partition wall 63 is formed to lay out cooling passages 50, 51, 52, and 53. Bottom plate 57 is attached to case main body 56 from below case main body 56.

Top plate 60 is formed in a plate shape and is disposed on a lower surface of metal plate 55. A plurality of coupling portions 61 are formed on an upper surface of metal plate 55. Each of coupling portions 61 is integrally coupled to bottom plate 40 through through hole 58. For example, module case 36, case main body 56 and metal plate 55 are integrally formed by insert molding and the like.

A contact area between top plate 60 and metal plate 55 is larger than an opening area of each through hole 58, and a contact area between bottom plate 40 and metal plate 55 is larger than an opening area of each through hole 58.

Top plate 60 and bottom plate 40 are connected by the plurality of coupling portions 61 passing through through holes 58. Therefore, even when vibrations are applied to power storage module 21, metal plate 55 can be maintained in a state of being fixed to case main body 56 and module case 36 due to an anchor effect.

Metal plate 55 is formed to be wider in the vehicle front-back direction than case main body 56, and a lower surface 70 of metal plate 55 is exposed from case main body 56. Lower surface 70 includes an exposed surface 71 located in front of case main body 56, and an exposed surface 72 located behind case main body 56.

Exposed surfaces 71 and 72 are bonded to front wall 32 and back wall 33 of housing case 20 by an adhesive 59, respectively.

Front wall 32 includes a base 73 and a wall 74, and wall 74 is formed to extend upward from an upper surface of base 73. A part of the upper surface of base 73 corresponds to a mounting surface 77 on which power storage module 21 is disposed.

Back wall 33 includes a base 75 and a wall 76, and wall 76 is formed to extend upward from an upper surface of base 75. A part of the upper surface of base 75 corresponds to a mounting surface 78 on which power storage module 21 is disposed.

Adhesive 59 is formed between mounting surface 77 and exposed surface 71 and between mounting surface 78 and exposed surface 72. Each of metal plate 55, base 73 and base 75 is made of metal. Therefore, power storage module 21 is strongly bonded to housing case 20 by adhesive 59. Furthermore, each of metal plate 55, base 73 and base 75 is made of metal, and thus, even when vibrations and the like are applied to power storage device 6, the occurrence of a fracture and the like in metal plate 55, base 73 and base 75 can be suppressed.

A fastening member such as a bolt for fixing power storage module 21 to housing case 20 can be omitted. By omitting the fastening member, an occupancy rate of power storage module 21 in housing case 20 can be increased and a capacitance when a capacity of housing case 20 is constant can be increased.

A heat conducting member 80 is disposed between a bottom surface of unit cell 37 and bottom plate 40. In the example shown in FIG. 4, bottom plate 40 is provided with a plurality of through holes 81. Through holes 81 are formed to extend from an upper surface to a lower surface of bottom plate 40, and a part of the upper surface of metal plate 55 is exposed from bottom plate 40 by through holes 81. Heat conducting member 80 extends into through holes 81, and heat conducting member 80 is in contact with metal plate 55.

Refrigerant C flows through each of cooling passages 50, 51, 52, and 53, such that the bottom surface side of unit cell 37 is cooled.

Metal plate 55 is made of metal and is formed at a position close to each of cooling passages 50, 51, 52, and 53. Therefore, metal plate 55 is likely to be cooled by cooler 22. Since heat conducting member 80 is in direct contact with metal plate 55, unit cell 37 can be satisfactorily cooled through heat conducting member 80. Furthermore, unit cell 37 includes a not-shown electrode assembly and a metallic cell case that houses the electrode assembly. Heat conducting member 80 has adhesiveness and heat conducting member 80 bonds the metallic cell case and metal plate 55 to each other through through holes 81. Thus, unit cell 37 is satisfactorily fixed to module case 36.

Figure 5:
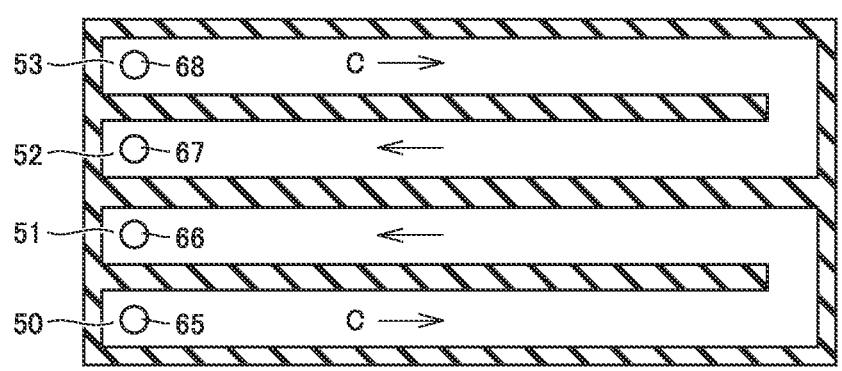
FIG. 5 is a cross-sectional view taken along line V-V shown in FIG. 4.

FIG. 5 is a cross-sectional view taken along line V-V shown in FIG. 4. Cooling passage 50 and cooling passage 51 are coupled to each other, and cooling passage 52 and cooling passage 53 are coupled to each other.

A supply port 65 is formed on one end side of cooling passage 50, and a discharge port 66 is formed on one end side of cooling passage 51. A discharge port 67 is formed on one end side of cooling passage 52, and a supply port 68 is formed on one end side of cooling passage 53.

Figure 6:
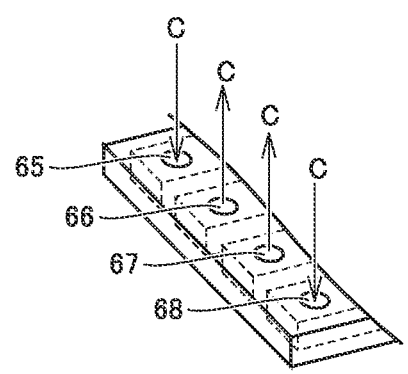
FIG. 6 is a perspective view showing one end side of a cooler 22.

FIG. 6 is a perspective view showing one end side of cooler 22. Refrigerant C is supplied from supply ports 65 and 68 to cooling passages 50 and 53, respectively. Refrigerant C is discharged from cooling passages 51 and 52 through discharge ports 66 and 67, respectively.

Figure 7:
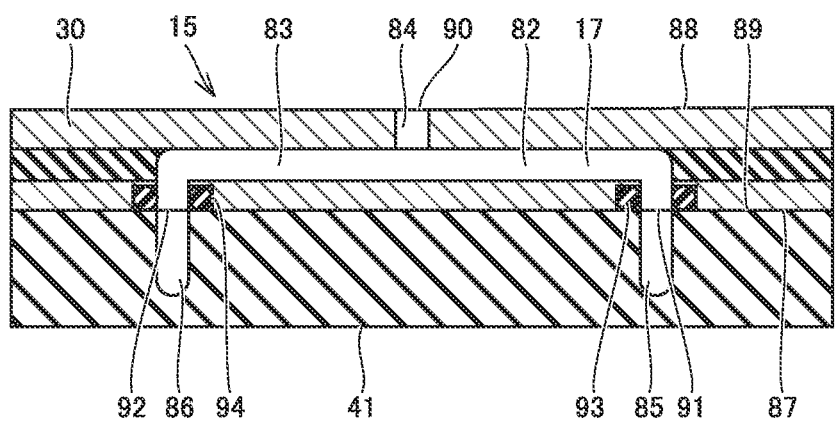
FIG. 7 is a cross-sectional view showing a supply path 15.
Figure 7:
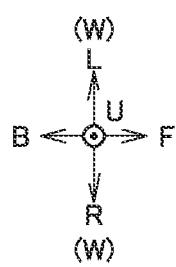
Figure 8:
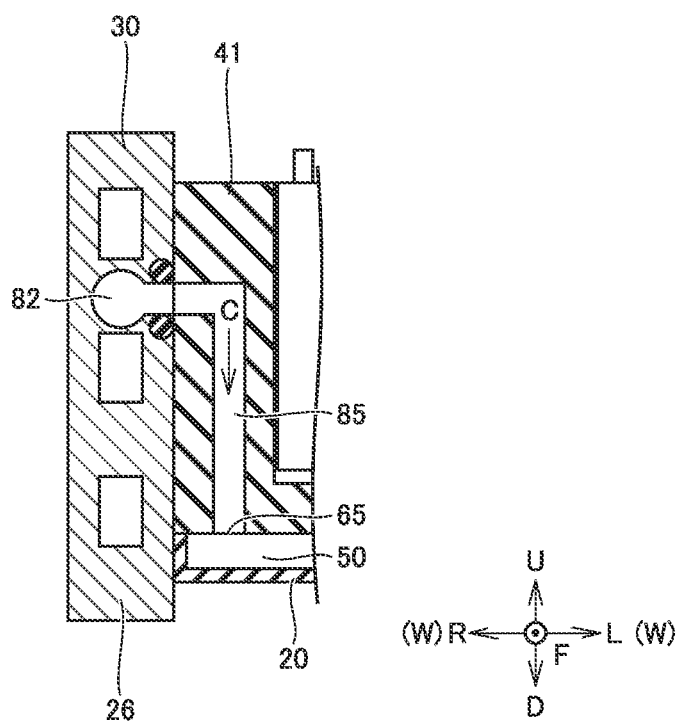
FIG. 8 is a cross-sectional view showing supply path 15.
Figure 9:
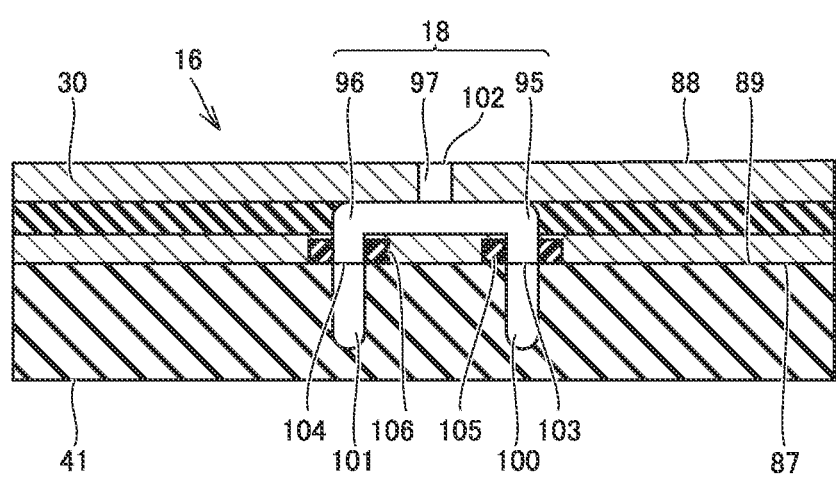
FIG. 9 is a cross-sectional view showing a discharge path 16.
Figure 9:
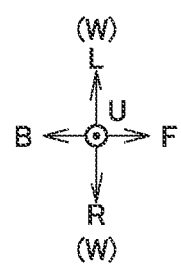
Figure 10:
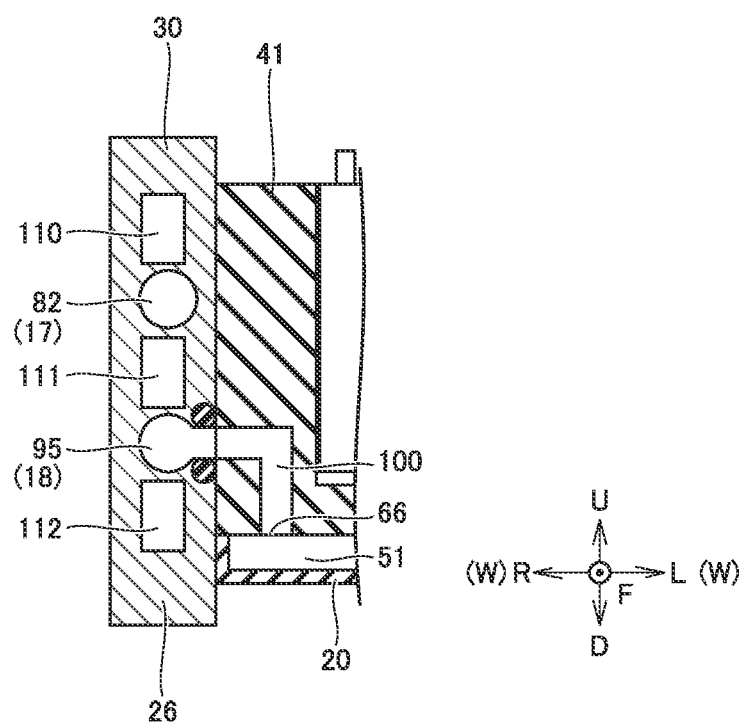
FIG. 10 is a cross-sectional view showing discharge path 16.

Next, a supply path 15 that supplies refrigerant C to cooler 22 and a discharge path 16 through which refrigerant C discharged from cooler 22 flows will be described. FIGS. 7 and 8 are cross-sectional views showing supply path 15, and FIGS. 9 and 10 are cross-sectional views showing discharge path 16.

In the present embodiment, supply path 15 and discharge path 16 are formed in right wall 30 and right wall 41.

In FIG. 7, right wall 30 includes an inner surface 87 and an outer surface 88. Inner surface 87 is in contact with right wall 41. Right wall 41 includes an abutment surface 89 that abuts against inner surface 87 of right wall 30.

Supply path 15 includes a supply passage 17 formed in right wall 30, and connection passages 85 and 86 formed in right wall 41. Supply passage 17 includes passages 82, 83 and 84 formed in right wall 30. Passage 84 extends in vehicle width direction W from outer surface 88. Passage 82 and passage 83 are connected to an end of passage 84. Passage 82 extends forward of vehicle 1 from the end of passage 84, and then, reaches inner surface 87. Passage 83 extends backward of vehicle 1 from the end of passage 84, and then, reaches inner surface 87.

Outer surface 88 is provided with an opening 90 of passage 84. A not-shown supply pipe is connected to opening 90. The supply pipe is connected to a not-shown heat exchanger and the like, and refrigerant C cooled by the heat exchanger is supplied to passage 84.

Inner surface 87 is provided with an opening 91 of passage 82 and an opening 92 of passage 83. A seal member 93 that surrounds opening 91, and a seal member 94 that surrounds opening 92 are disposed on inner surface 87 of outer surface 88.

Abutment surface 89 of right wall 41 abuts against inner surface 87 of right wall 30, such that connection passage 85 is connected to opening 91 and connection passage 86 is connected to opening 92. Seal member 93 suppresses leakage of refrigerant C from a connection portion of passage 82 and connection passage 85, and seal member 94 suppresses leakage of refrigerant C from a connection portion of passage 83 and connection passage 86. When power storage module 21 is deformed to become longer in vehicle width direction W as a result of charging and discharging of power storage module 21, adhesion between abutment surface 89 and inner surface 87 is enhanced and sealability by seal members 93 and 94 is also enhanced.

Connection passages 85 and 86 are formed to extend in vehicle width direction W from abutment surface 89, and then, to extend downward. Referring to FIG. 8, a lower end of connection passage 85 is connected to supply port 65 of cooler 22.

Connection passage 85 is formed in right wall 41 and supply port 65 of cooler 22 is also formed in right wall 41. If the supply pipe that supplies the refrigerant to cooler 22 is attached to cooler 22, it is necessary to precisely align the supply pipe with the supply port of cooler 22, and to ensure sealability. However, in the example shown in FIG. 8, alignment and ensuring of sealability are unnecessary, and thus, cooler 22 and power storage module 21 can be easily assembled.

A lower end of connection passage 86 is connected to supply port 68, and connection passage 86 and supply port 68 are also formed in right wall 41. Therefore, connection passage 86 and supply port 68 can also produce an effect similar to the effect produced by connection passage 85 and supply port 65.

Referring to FIG. 9, discharge path 16 includes a discharge passage 18 formed in right wall 30, and connection passages 100 and 101 formed in right wall 41. Discharge passage 18 includes passages 95, 96 and 97 formed in right wall 30.

Passage 97 extends in vehicle width direction W from outer surface 88. Passages 95 and 96 are connected to an end of passage 97. Passage 95 is formed to extend forward of vehicle 1 from the end of passage 97, and then, reach inner surface 87. Passage 96 is formed to extend backward of vehicle 1 from the end of passage 97, and then, reach inner surface 87. In the vehicle front-back direction, a length of passages 95 and 96 is shorter than a length of passages 82 and 83 shown in FIG. 7.

Outer surface 88 is provided with an opening 102 of passage 97. A not-shown discharge pipe is connected to opening 102, and refrigerant C discharged from opening 102 is supplied to the heat exchanger.

Inner surface 87 is provided with an opening 103 of passage 95 and an opening 104 of passage 96. A seal member 105 that surrounds opening 103, and a seal member 106 that surrounds opening 104 are provided on inner surface 87.

Connection passage 100 is connected to opening 103, and connection passage 101 is connected to opening 104. Seal member 105 suppresses leakage of refrigerant C from a connection portion of connection passage 100 and passage 95, and seal member 106 suppresses leakage of refrigerant C from a connection portion of connection passage 101 and passage 96. When power storage module 21 is deformed to become longer in vehicle width direction W as a result of charging and discharging, adhesion between right wall 30 and left wall 31 is enhanced and sealability by seal members 105 and 106 is also enhanced.

As described above, supply path 15 that supplies refrigerant C to cooler 22 and discharge path 16 through which refrigerant C discharged from cooler 22 flows are formed in right wall 30 and right wall 41. Therefore, the number of components can be reduced, as compared with the case of connecting a pipe and the like to cooler 22 to supply refrigerant C to cooler 22 and discharge refrigerant C from cooler 22.

Referring to FIG. 10, connection passage 100 extends in vehicle width direction W, and then, extends downward. A lower end of connection passage 100 is connected to discharge port 66. Refrigerant C discharged from discharge port 66 flows into connection passage 100.

Connection passage 101 is formed similarly to connection passage 100, and a lower end of connection passage 101 is connected to discharge port 67. Connection passages 100 and 101 and discharge ports 66 and 67 are all formed in right wall 41. Therefore, alignment and ensuring of sealability are unnecessary, as compared with the case in which the discharge pipe for discharging refrigerant C from cooler 22 is connected to cooler 22, and thus, housing case 20 and cooler 22 can be easily assembled.

Figure 11:
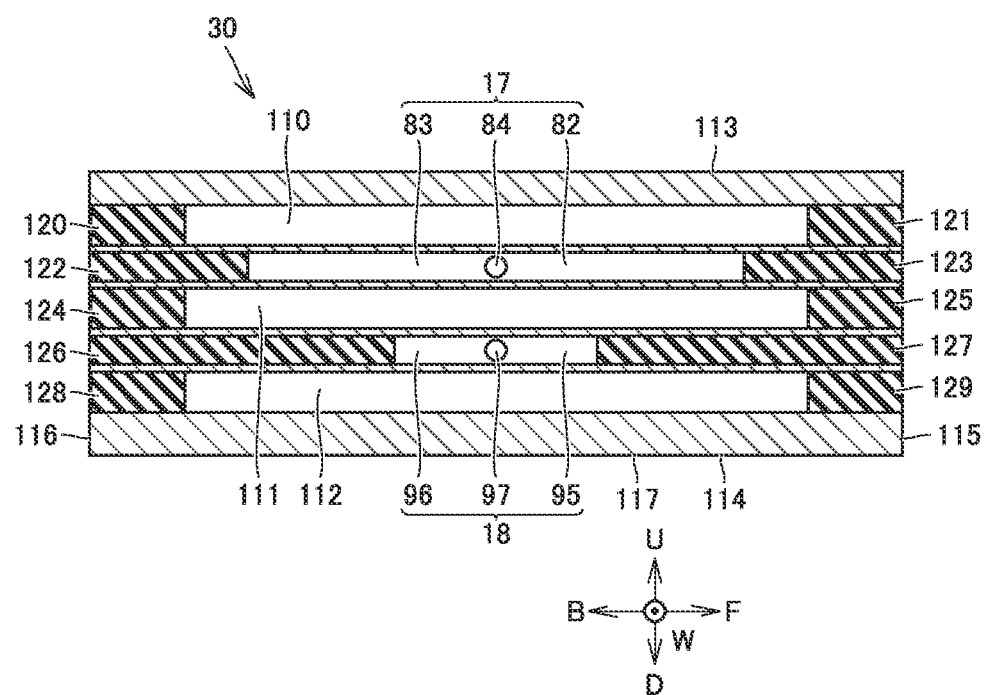
FIG. 11 is a cross-sectional view showing a right wall 30.

FIG. 11 is a cross-sectional view showing right wall 30. Right wall 30 includes an upper surface 113, a lower surface 114, a side surface 115, and a side surface 116. Side surface 115 is located on the vehicle forward side, and side surface 116 is located on the vehicle backward side.

Right wall 30 includes a wall main body 117, and a plurality of filled portions 120 to 129 filled into wall main body 117.

Wall main body 117 is provided with a plurality of through holes extending in the vehicle front-back direction and spaced apart from each other in the upward-downward direction. In the vehicle forward direction, both ends of the through holes are closed by filled portions 120 to 129.

Thus, a hollow portion 110, supply passage 17, a hollow portion 111, discharge passage 18, and a hollow portion 112 are formed in right wall 30. Hollow portion 110, supply passage 17, hollow portion 111, discharge passage 18, and hollow portion 112 are formed to be sequentially arranged from the upper surface 113 side toward lower surface 114.

Supply passage 17 is formed above discharge passage 18. Hollow portion 111 is formed between supply passage 17 and discharge passage 18. Hollow portion 110 is formed between upper surface 113 and supply passage 17, and hollow portion 112 is formed between lower surface 114 and discharge passage 18. Wall main body 117 is formed by extrusion molding and the like.

Figure 12:
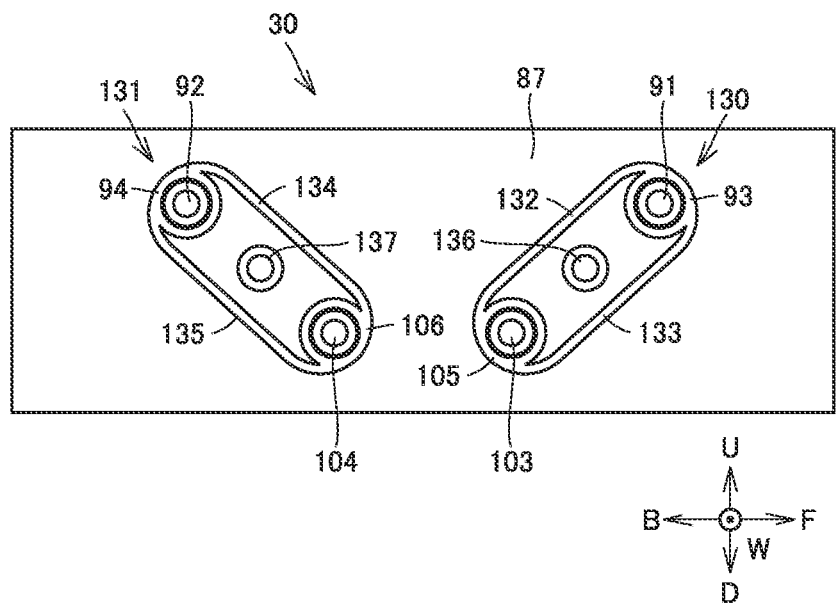
FIG. 12 is a plan view showing an inner surface 87 of right wall 30.

FIG. 12 is a plan view showing inner surface 87 of right wall 30. A seal member 130 and a seal member 131 are disposed on inner surface 87. Seal member 130 includes seal member 93, seal member 105 and coupling pieces 132 and 133. Seal member 93 and seal member 105 are formed annularly, and seal members 93 and 105 are formed to surround openings 91 and 103, respectively. Coupling pieces 132 and 133 are formed to connect seal member 93 and seal member 105 to each other.

Seal member 131 includes seal member 94, seal member 106 and coupling pieces 134 and 135. Seal members 94 and 106 are formed annularly, and seal members 94 and 106 are formed to surround openings 92 and 104, respectively. Coupling pieces 134 and 135 are formed to connect seal member 94 and seal member 106 to each other. Seal members 130 and 131 are formed by solid gaskets or curable adhesives.

Pins 136 and 137 protruding from inner surface 87 are formed on inner surface 87 of right wall 30.

Abutment surface 89 of right wall 41 abuts against inner surface 87 of right wall 30, and recessed portions are formed in abutment surface 89 at positions corresponding to pins 136 and 137. By inserting pins 136 and 137 into the recessed portions of abutment surface 89, right wall 30 and right wall 41 are precisely positioned.

By aligning right wall 30 with right wall 41, alignment between supply path 15 formed in right wall 30 and connection passages 85 and 86 formed in right wall 41 shown in FIG. 7, and alignment between discharge passage 18 and connection passages 100 and 101 shown in FIG. 9 can be performed together. Thus, sealability between supply path 15 and connection passages 85 and 86 and sealability between discharge passage 18 and connection passages 100 and 101 can be easily ensured.

Vehicle 1 on which power storage device 6 configured as described above is mounted will be described. Referring to FIG. 1, in a sunny weather state, a temperature of the ground 19 may increase and power storage device 6 may be heated by radiant heat from the ground 19.

In a state where engine 3 is being driven, a temperature of engine 3 and exhaust pipe 7 increases, and the air around engine 3 and exhaust pipe 7 is heated. When vehicle 1 travels, the heated air flows from the vehicle forward side to the vehicle backward side.

In FIG. 2, the radiant heat from the ground 19 enters bottom plate 25 of housing case 20, which is likely to cause an increase in temperature of bottom plate 25.

Furthermore, when the air heated by engine 3 and the like flows toward the vehicle backward side, the heated air is less likely to flow through a gap between floor panel 10 and cover member 27, because the gap between floor panel 10 and cover member 27 is narrow.

A flow velocity of the heated air flowing through a lower surface of bottom plate 25 is higher than a flow velocity of the heated air flowing through the gap between floor panel 10 and cover member 27. Therefore, an amount of heat received from the heated air by bottom plate 25 is larger than an amount of heat received by cover member 27. Therefore, the temperature of bottom plate 25 is likely to increase.

On the other hand, housing case 20 is provided with a refrigerant passage 23 including supply passage 17 and discharge passage 18, and refrigerant passage 23 is formed in a portion of housing case 20 located above bottom plate 25. Therefore, an increase in temperature of refrigerant C flowing through refrigerant passage 23 can be suppressed, and low-temperature refrigerant C can be supplied to cooler 22. Thus, power storage module 21 can be satisfactorily cooled.

Since cooler 22 is disposed on the lower surface side of power storage module 21, transmission of heat of bottom plate 25 to power storage module 21 can be suppressed even when the temperature of bottom plate 25 increases.

Cooler 22 is spaced apart from bottom plate 25 and disposed above bottom plate 25. Therefore, direct heating of cooler 22 by bottom plate 25 is suppressed even when the temperature of bottom plate 25 increases. Thus, a reduction in cooling capability of cooler 22 is suppressed, and power storage module 21 can be satisfactorily cooled.

Right wall 30 is provided at a position adjacent to member 13, and a gap between right wall 30 and member 13 is narrow. Therefore, the air heated by engine 3 and the like is less likely to enter the gap between right wall 30 and member 13.

Therefore, right wall 30 is less likely to be exposed to the high-temperature air, and an increase in temperature of refrigerant C flowing through refrigerant passage 23 is suppressed. Thus, low-temperature refrigerant C can be supplied to cooler 22, and thus, power storage module 21 can be satisfactorily cooled.

Supply passage 17 is formed above discharge passage 18, and supply passage 17 is more distant from bottom plate 25 than discharge passage 18. Therefore, an increase in temperature of refrigerant C flowing through supply passage 17 is suppressed, and an increase in temperature of refrigerant C supplied to cooler 22 is suppressed. Therefore, low-temperature refrigerant C can be supplied to cooler 22, and thus, power storage module 21 can be satisfactorily cooled.

Refrigerant passage 23 is formed in right wall 30, and a refrigerant passage is not formed in left wall 31. Therefore, a structure of left wall 31 can be simplified, which leads to a reduction in manufacturing cost of power storage device 6.

Furthermore, exhaust pipe 7 is disposed adjacent to left wall 31, and right wall 30 having refrigerant passage 23 is significantly distant from exhaust pipe 7. Therefore, an increase in temperature of refrigerant C flowing through refrigerant passage 23 is suppressed even when a temperature of exhaust pipe 7 increases.

In FIG. 11, since refrigerant C flowing through discharge passage 18 is heated by cooler 22, a temperature of refrigerant C flowing through discharge passage 18 is higher than a temperature of refrigerant C flowing through supply passage 17.

However, hollow portion 111 serving as an air layer is disposed between discharge passage 18 and supply passage 17, and thus, heating of refrigerant C flowing through supply passage 17 by refrigerant C flowing through discharge passage 18 is suppressed.

In the vehicle front-back direction, a length of hollow portion 111 is longer than lengths of supply passage 17 and discharge passage 18. Therefore, heating of refrigerant C flowing through supply passage 17 by refrigerant C flowing through discharge passage 18 can be satisfactorily suppressed.

Hollow portion 110 is provided between upper surface 113 and supply passage 17. Furthermore, in the vehicle front-back direction, a length of hollow portion 110 is longer than the length of supply passage 17, and thus, transmission of heat on the upper surface 113 side to supply passage 17 is suppressed. Therefore, an increase in temperature of refrigerant C flowing through supply passage 17 is suppressed even when a temperature of upper surface 113 increases. As described above, an increase in temperature of refrigerant C flowing through supply passage 17 is suppressed, and thus, cooler 22 can satisfactorily cool power storage module 21.

Hollow portion 112 serving as an air layer is disposed between lower surface 114 and discharge passage 18. Furthermore, in the vehicle front-back direction, a length of hollow portion 112 is longer than the length of discharge passage 18. Therefore, heating of refrigerant C in discharge passage 18 by heat from below can be satisfactorily suppressed. Thus, the cooling capability required for the heat exchanger that cools refrigerant C can be kept low, which allows a reduction in size of the heat exchanger.

(First Modification)

Figure 13:
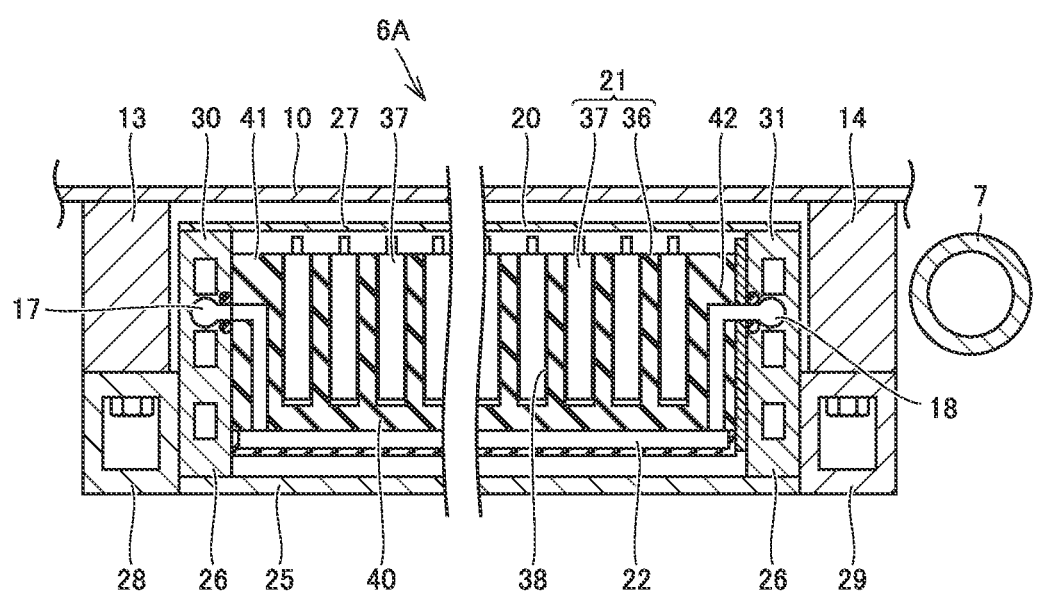
FIG. 13 is a cross-sectional view showing a power storage device 6A according to a first modification.
Figure 13:
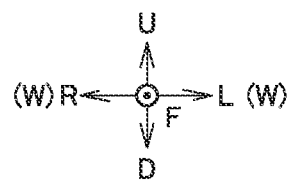

FIG. 13 is a cross-sectional view showing a power storage device 6A according to a first modification. In the example shown in FIG. 13, supply passage 17 is formed in right wall 30, and discharge passage 18 is formed in left wall 31.

Exhaust pipe 7 is provided at a position adjacent to left wall 31. Therefore, a temperature of left wall 31 is likely to become higher than a temperature of right wall 30. On the other hand, discharge passage 18 through which refrigerant C flows is disposed in left wall 31, and thus, an increase in temperature of left wall 31 is suppressed.

Thus, a difference in temperature between right wall 30 and left wall 31 is reduced, and temperature variations of power storage module 21 can be suppressed in vehicle width direction W.

(Second Modification)

Figure 14:
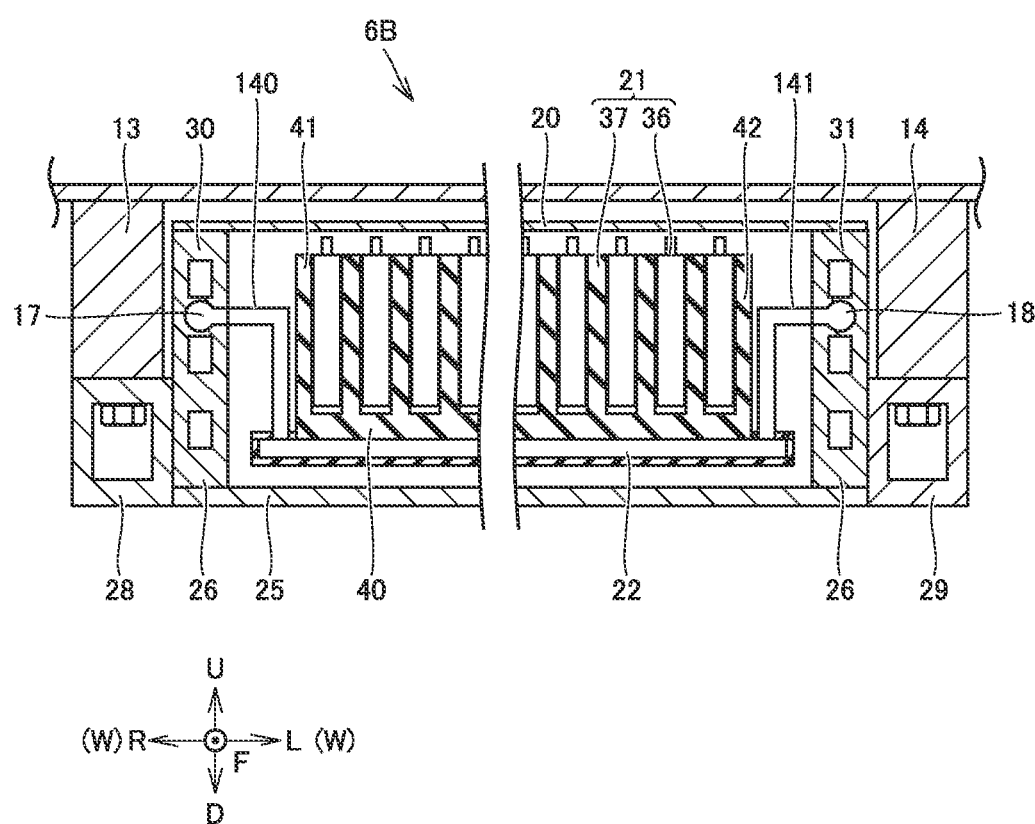
FIG. 14 is a cross-sectional view showing a power storage device 6B according to a second modification.

FIG. 14 is a cross-sectional view showing a power storage device 6B according to a second modification. In power storage device 6B, right wall 30 and right wall 41 are distant from each other, and left wall 31 and left wall 42 are distant from each other.

Supply passage 17 is formed in right wall 30, and discharge passage 18 is formed in left wall 31. Connection passages 85 and 86 are not formed in right wall 41, and connection passages 100 and 101 are not formed in left wall 42.

Power storage device 6B includes a connection pipe 140 that connects supply passage 17 and cooler 22 to each other, a connection pipe 141 that connects cooler 22 and discharge passage 18 to each other, and a fixing member that fixes power storage module 21 to right wall 30 and left wall 31. The fixing member is not shown.

In power storage device 6B as well, supply passage 17 and discharge passage 18 are formed in portions of housing case 20 located above bottom plate 25. Therefore, even when a temperature of bottom plate 25 increases, an increase in temperature of refrigerant C flowing through supply passage 17 and discharge passage 18 can be suppressed. Thus, cooler 22 can satisfactorily cool power storage module 21.

(Third Modification)

Figure 15:
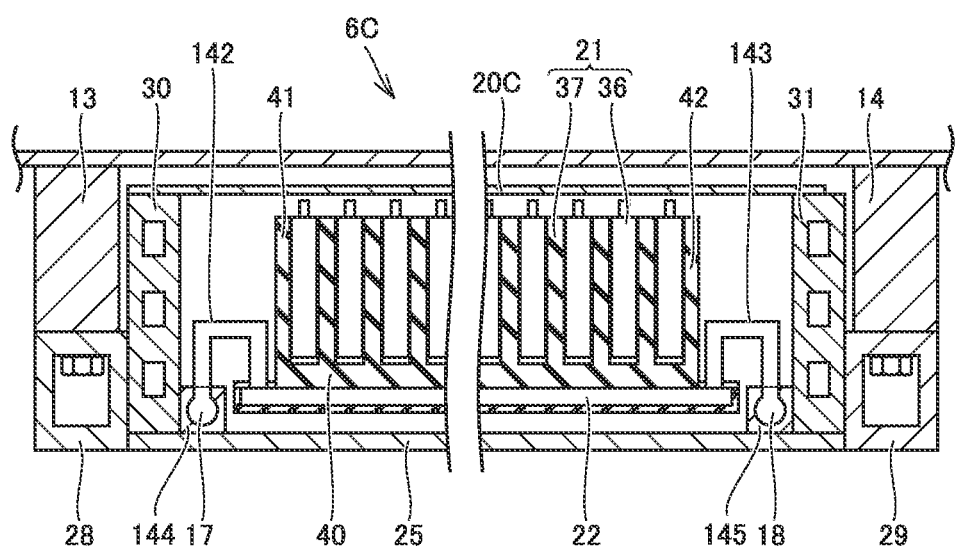
FIG. 15 is a cross-sectional view showing a power storage device 6C according to a third modification.
Figure 15:
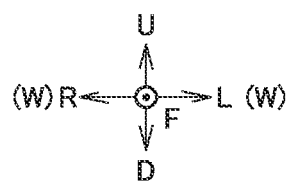

FIG. 15 is a cross-sectional view showing a power storage device 6C according to a third modification. In power storage device 6C as well, right wall 30 and right wall 41 are distant from each other, and left wall 31 and left wall 42 are also distant from each other.

A housing case 20C of power storage device 6C further includes side frames 144 and 145. Side frames 144 and 145 are disposed on an upper surface of bottom plate 25. Side frame 144 is provided to be in contact with an inner surface of right wall 30. Side frame 145 is provided to be in contact with an inner surface of left wall 31. Side frames 144 and 145 are formed to extend in the vehicle front-back direction.

In power storage device 6C, supply passage 17 is formed in side frame 144, and discharge passage 18 is formed in side frame 145.

Power storage device 6C includes a connection pipe 142 that connects supply passage 17 and cooler 22 to each other, and a connection pipe 143 that connects cooler 22 and discharge passage 18 to each other.

In power storage device 6C as well, supply passage 17 and discharge passage 18 are formed in portions of housing case 20C located above bottom plate 25. Therefore, an increase in temperature of refrigerant C flowing through supply passage 17 and discharge passage 18 is suppressed.

(Fourth Modification)

Figure 16:
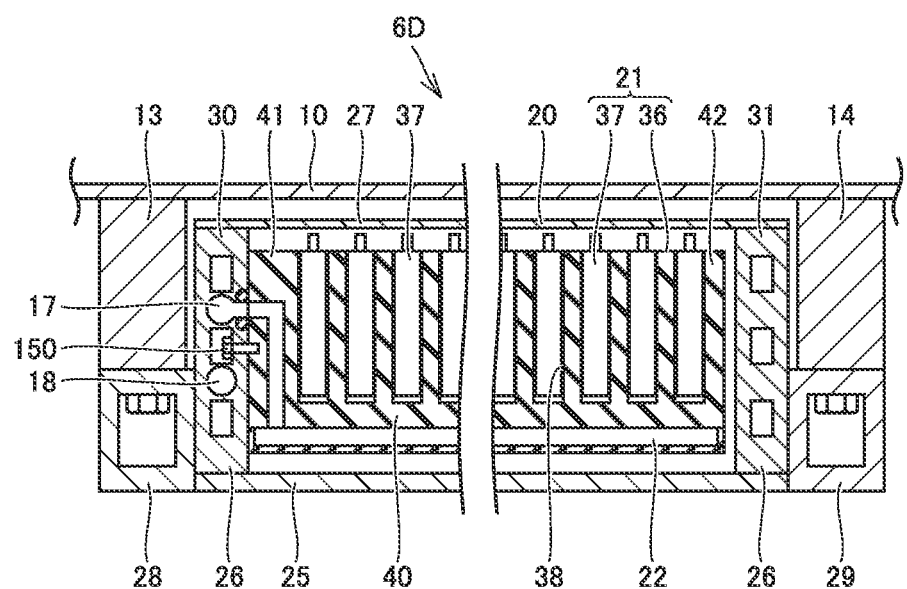
FIG. 16 is a cross-sectional view showing a power storage device 6D according to a fourth modification.

FIG. 16 is a cross-sectional view showing a power storage device 6D according to a fourth modification. In power storage device 6D, left wall 42 and left wall 31 are distant from each other, while right wall 41 and right wall 30 abut against each other. Power storage device 6D includes a fastening member 150 that couples right wall 30 and right wall 41 to each other. Fastening member 150 is, for example, a bolt and the like.

Except for fastening member 150, power storage device 6D is configured similarly to power storage device 6 according to the first embodiment. Therefore, in power storage device 6D as well, supply passage 17 and discharge passage 18 are formed in right wall 30, and a connection passage that connects cooler 22 and supply passage 17 to each other and a connection passage that connects cooler 22 and discharge passage 18 to each other are formed in right wall 41.

As described above, right wall 30 and right wall 41 may be pressure-bonded by using fastening member 150 instead of insertion member 46.

(Fifth Modification)

Figure 17:
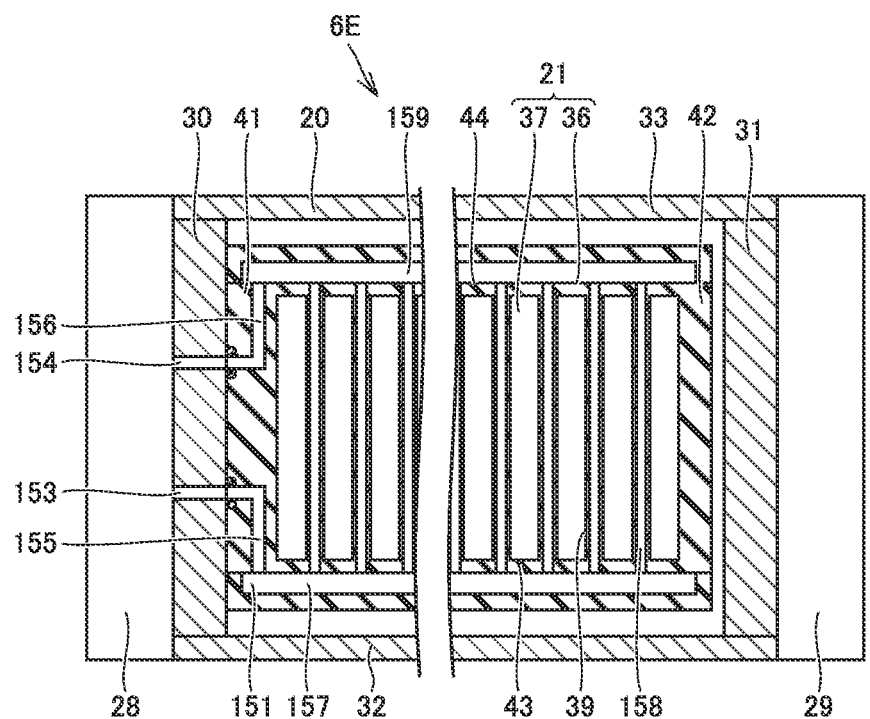
FIG. 17 is a cross-sectional view showing a power storage device 6E according to a fifth modification.
Figure 17:
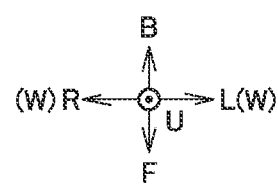

FIG. 17 is a cross-sectional view showing a power storage device 6E according to a fifth modification. Power storage device 6E includes a cooler 151. Cooler 151 includes a supply duct 157, a plurality of cooling passages 158, and an exhaust duct 159.

Supply duct 157 is attached to front wall 43 of module case 36, and exhaust duct 159 is attached to back wall 44 of module case 36. Each of supply duct 157 and exhaust duct 159 is formed to be long in vehicle width direction W.

Each of cooling passages 158 is formed in each partition wall 39 of module case 36. Each of cooling passages 158 is formed to extend in the vehicle front-back direction, and each of cooling passages 158 communicates with supply duct 157 and exhaust duct 159.

The plurality of cooling passages 158 may be formed in partition walls 39 to be spaced apart from each other in a height direction.

In power storage device 6E, a not-shown fastening member such as a bolt is used to bring right wall 30 and right wall 41 into close contact with each other. Insertion member 46 and the like may be inserted between left wall 42 and left wall 31 to bring right wall 30 and right wall 41 into close contact with each other.

A supply passage 153 and a discharge passage 154 are formed in right wall 30. Connection passages 155 and 156 are formed in right wall 41.

Supply passage 153 and connection passage 155 communicate with each other, and connection passage 155 communicates with supply duct 157. In addition, connection passage 156 and discharge passage 154 communicate with each other, and connection passage 156 communicates with exhaust duct 159.

Refrigerant C cooled by a not-shown heat exchanger is supplied to supply passage 153. Then, refrigerant C sequentially flows through supply passage 153, connection passage 155 and supply duct 157. Refrigerant C flows through cooling passages 158 to thereby cool unit cells 37.

Refrigerant C that has cooled unit cells 37 enters exhaust duct 159. Thereafter, refrigerant C sequentially flows through connection passage 156 and discharge passage 154, and then, is cooled in the heat exchanger.

As described above, in power storage device 6E as well, connection passages 155 and 156 are formed in right wall 41, and supply passage 153 and discharge passage 154 are formed in right wall 30. Therefore, by aligning right wall 30 with right wall 41, alignment between discharge passage 154 and connection passage 156 and alignment between supply passage 153 and connection passage 155 can be performed together. Thus, misalignment of each passage can be suppressed and sealability of a connection portion of each passage is easily ensured.

In power storage device 6E, cooler 151 is provided on a side surface of module case 36.

When a vehicle including power storage device 6E is travelling, an obstacle and the like may be on a road surface and the obstacle may come into collision with front wall 32 of power storage device 6E.

In this case, supply duct 157 provided on front wall 43 functions as a cushioning member. Thus, application of large impact force to unit cells 37 can be suppressed.

(Sixth Modification)

Figure 18:
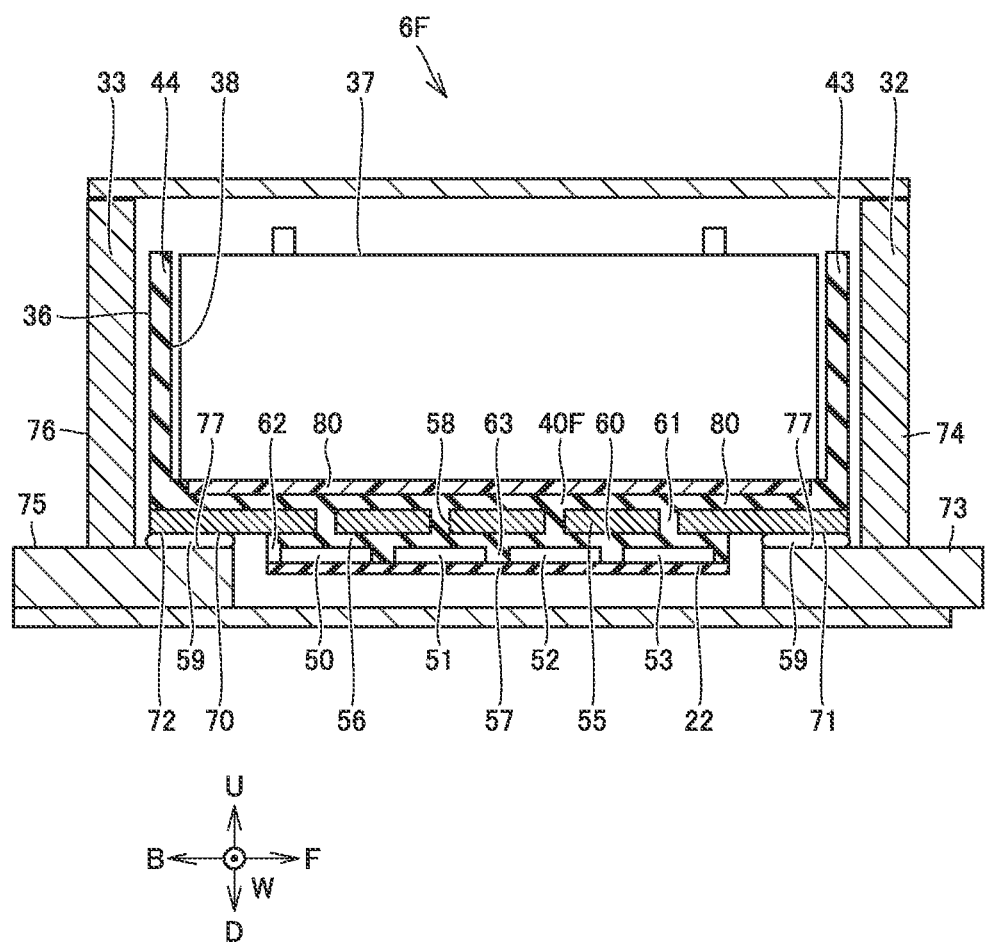
FIG. 18 is a cross-sectional view showing a power storage device 6F according to a sixth modification.

FIG. 18 is a cross-sectional view showing a power storage device 6F according to a sixth modification. Unlike power storage device 6 shown in FIG. 4, in power storage device 6F, a bottom plate 40F is not provided with through hole 81.

Therefore, a strength of bottom plate 40F is high, and even when vibrations are applied to power storage device 6F, the occurrence of a fracture and the like in bottom plate 40F can be suppressed. In power storage device 6F as well, cooler 22 is formed integrally with module case 36. Furthermore, exposed surfaces 71 and 72 of metal plate 55 that are a part of cooler 22 and bases 73 and 75 that are a part of housing case 20 and made of metal are bonded by adhesive 59. Therefore, in power storage device 6F as well, cooler 22 and power storage module 21 are satisfactorily fixed to housing case 20.

(Seventh Modification)

FIG. 19 is a cross-sectional view showing a power storage device 6G according to a seventh modification. Power storage device 6G includes a cooler 22G.

Cooler 22G includes a main body portion 160, a projecting portion 161 and a projecting portion 162. Cooling passages 50, 51, 52, and 53 are formed in main body portion 160.

Projecting portion 161 is formed to project from an upper surface of main body portion 160 toward the vehicle backward side, and projecting portion 162 is formed to project from the upper surface of main body portion 160 toward the vehicle forward side. Each of main body portion 160, projecting portion 161 and projecting portion 162 is made of a metal material.

A lug 165 is formed at a lower end of back wall 44, and a lug 166 is formed at a lower end of front wall 43. Lug 165 locks projecting portion 161, and lug 166 locks projecting portion 162. Thus, cooler 22G is integrally fixed to module case 36.

A part of a lower surface of projecting portion 161 is exposed from lug 165, and a part of a lower surface of projecting portion 162 is exposed from lug 166. Adhesives 59 bond upper surfaces of bases 75 and 73 to the lower surfaces of projecting portions 161 and 162, respectively.

As described above, in power storage device 6G as well, adhesive 59 bonds the metals to each other. Therefore, cooler 22G is strongly fixed to bases 73 and 75.

As described above, in power storage device 6G as well, the metal portion of a power storage module 21F and housing case 20 are bonded by adhesive 59.

Thus, in power storage device 6G as well, power storage module 21 and cooler 22G can be strongly fixed to housing case 20, and a fastening member such as a bolt can be omitted.

Although the embodiment of the present disclosure has been described above, it should be understood that the embodiment disclosed herein is illustrative and non-restrictive in every respect. The technical scope of the present disclosure is defined by the terms of the claims and is intended to include any modifications within the scope and meaning equivalent to the terms of the claims.

What is claimed is:

1. A power storage device provided below a floor panel of a vehicle, the power storage device comprising:
    a housing case;
    a power storage module housed in the housing case; and
    a cooler housed in the housing case to cool the power storage module, wherein
    the housing case includes a bottom plate and a peripheral wall portion extending upward from the bottom plate,
    a refrigerant passage through which a refrigerant flows is formed in the peripheral wall portion of the housing case, and
    the refrigerant passage is connected to the cooler.

2. The power storage device according to claim 1, wherein the vehicle includes a body frame, and
    the housing case includes tag peripheral wall portion extending upward from the bottom plate and disposed at a position adjacent to the body frame.

3. The power storage device according to claim 1, wherein the refrigerant passage includes a supply passage that supplies the refrigerant to the cooler, and a discharge passage through which the refrigerant discharged from the cooler flows, and
    the supply passage is located above the discharge passage.

4. The power storage device according to claim 1, wherein
the housing case includes a first side wall portion located on one end side in a width direction of the vehicle, and a second side wall portion located on the other end side in the width direction, and
the refrigerant passage is formed in the first side wall portion.

5. The power storage device according to claim 4, wherein
the vehicle includes an engine, and an exhaust pipe connected to the engine, and
the second side wall portion is disposed at a position adjacent to the exhaust pipe.

6. The power storage device according to claim 1, wherein
the vehicle includes an engine, and an exhaust pipe connected to the engine,
the housing case includes a first side wall portion located on one end side in a width direction of the vehicle, and a second side wall portion located on the other end side in the width direction,
the refrigerant passage includes a supply passage that supplies the refrigerant to the cooler, and a discharge passage through which the refrigerant discharged from the cooler flows,
the supply passage is formed in the first side wall portion,
the discharge passage is formed in the second side wall portion, and
the second side wall portion is disposed at a position adjacent to the exhaust pipe.

7. The power storage device according to claim 1, wherein the cooler is disposed on a lower surface of the power storage module.

8. The power storage device according to claim 1, wherein the housing case includes a cover member on an upper surface of the housing case.

9. The power storage device according to claim 1, wherein the power storage module comprises a module case, the module case including one or more walls and a second bottom plate.

* * * * *

UNITED STATES PATENT AND TRADEMARK OFFICE
CERTIFICATE OF CORRECTION

PATENT NO. : 11,897,322 B2
APPLICATION NO. : 17/387306
DATED : February 13, 2024
INVENTOR(S) : Yutaroh Gotoh et al.

It is certified that error appears in the above-identified patent and that said Letters Patent is hereby corrected as shown below:

In the Claims

In Claim 2, Line 3 (Column 14, Line 59), delete "tag" and insert --the--.

Signed and Sealed this
Third Day of September, 2024

Katherine Kelly Vidal
*Director of the United States Patent and Trademark Office*